(12) United States Patent
Murphy et al.

(10) Patent No.: US 7,063,810 B1
(45) Date of Patent: Jun. 20, 2006

(54) CO-EXTRUSION OF ENERGETIC MATERIALS USING MULTIPLE TWIN SCREW EXTRUDERS

(75) Inventors: Constance Murphy, Waldorf, MD (US); John Brough, Indian Head, MD (US); Richard S. Muscato, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 211 days.

(21) Appl. No.: 10/307,535

(22) Filed: Nov. 27, 2002

(51) Int. Cl.
*C06B 21/00* (2006.01)
(52) U.S. Cl. .................... 264/3.3; 264/173.16
(58) Field of Classification Search ................ 264/3.3, 264/3.2, 102, 173.12, 173.16, 211.23, 280, 264/148
See application file for complete search history.

(56) References Cited

U.S. PATENT DOCUMENTS

| | | | | |
|---|---|---|---|---|
| 4,120,920 A | * | 10/1978 | Cougoul et al. | 264/3.3 |
| 4,978,482 A | * | 12/1990 | Johnson et al. | 264/3.1 |
| 5,190,711 A | * | 3/1993 | Blemberg | 264/173.13 |
| 5,467,714 A | * | 11/1995 | Lund et al. | 102/284 |
| 5,565,150 A | | 10/1996 | Dillehay et al. | 264/3.3 |
| 5,589,203 A | * | 12/1996 | Sato | 425/147 |
| 5,610,444 A | * | 3/1997 | Austruy et al. | 264/3.3 |
| 5,670,098 A | * | 9/1997 | Dillehay et al. | 264/3.3 |
| 5,690,868 A | * | 11/1997 | Strauss et al. | 264/3.1 |
| 5,716,557 A | * | 2/1998 | Strauss et al. | 264/3.3 |
| 5,844,322 A | * | 12/1998 | Andersson et al. | 264/3.3 |
| 6,165,307 A | * | 12/2000 | Fair et al. | 156/264 |
| 6,171,530 B1 | * | 1/2001 | Haaland et al. | 264/3.2 |
| 6,238,501 B1 | * | 5/2001 | Stec et al. | 149/109.6 |
| 6,312,625 B1 | * | 11/2001 | Nielson et al. | 264/3.3 |
| 6,315,930 B1 | * | 11/2001 | Hamilton | 264/3.1 |
| 6,361,719 B1 | * | 3/2002 | Dillehay et al. | 264/3.3 |
| 6,378,306 B1 | * | 4/2002 | Koelle et al. | 60/605.1 |
| 6,432,231 B1 | * | 8/2002 | Nielson et al. | 149/19.3 |
| 6,736,913 B1 | * | 5/2004 | Hatch | 149/19.92 |

* cited by examiner

*Primary Examiner*—Mark Eashoo
(74) *Attorney, Agent, or Firm*—Fredric Zimmerman

(57) ABSTRACT

The invention comprises a continuous, integrated process to produce a multiple layered energetic material where the layers comprise energetic materials having, at least, two different burning rates. The process uses at least two twin-screw extruders to process at least two different energetic materials. These energetic materials are extruded into a co-extrusion die that, first, thins each energetic material flow into layers, and, then, combines the layers into a multiple layered energetic material. One embodiment of the invention also includes a remote take away system that completes processing the multiple layered energetic material after it leaves the co-extrusion die. The outer edges of the multiple layered material are first trim cut, then rolled into wrapped spools. Finally, the wrapped spools are cut into specified lengths for final use. These cutting, trimming and rolling steps are all done automatically, with no personnel handling required.

20 Claims, 4 Drawing Sheets

CO-EXTRUSION OF ENERGETIC MATERIALS USING MULTIPLE TWIN SCREW EXTRUDERS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to the process of making energetic materials, more particularly to a continuous process for making co-layered energetic materials, and most particularly to a continuous process for making co-layered energetic materials using multiple twin-screw extruders.

2. Description of the Related Art

For many years, it has been known that combining separate layers of different energetic materials produces a final energetic product that generates increased performance for certain uses. The current method of making co-layered or multi-layered energetic materials requires numerous processing steps.

First, different energetic formulations are mixed and extruded into ribbons. This extrusion can be accomplished using numerous methods disclosed within the prior art. The individual ribbons are then rolled to a desired thickness. These multiple ribbons are then rolled into a multi-layered ribbon. The multi-layered ribbon is finally cut into the final desired shapes. Their are many problems and limitations associated with this method. Due to the number of steps, the labor involved in each step, and the multiple pieces of equipment necessary for the number of steps, the manufacturing costs for the current process are quite high. Also, due to the number of processing steps that require personnel handling of the energetic material, the safety risks are great associated with the above described processing technique. Finally, due to the large number of cutting and trimming operations involved in the process, high amounts of waste material result.

One particular method has been developed to improve safety by reduction of handling for energetic material manufacture. U.S. Pat. No. 5,565,150 discloses a process of continuous mixing of energetic materials in a twin-screw extruder, followed by granulating and drying. The patent discloses a process of mixing energetic materials within the twin-screw extruder and having the twin-screws bulk granulate the material in order to obtain energetic granules used for gun propellants and other uses. This process reduces personnel handling of material resulting in a significant safety reduction. However, this process results in granules of energetic materials of one particular formulation and not ribbons of energetic materials of differing formulations.

Therefore, it is desired to provide a method of producing co or multi-layered energetic materials using multiple twin-screw extruders in order to reduce manufacturing costs and increase safety.

SUMMARY OF THE INVENTION

The present invention comprises a continuous process to produce multiple layered energetic materials. This process uses minimum personnel handling in order to increase safety versus the currently used process. The present invention also significantly reduces waste by using a remote take away system in order to complete processing of the multiple layered energetic material.

Accordingly, it is an object of this invention to provide a continuous process to produce multiple layered energetic materials.

It is a further object of this invention to provide a process to produce multiple layered energetic materials that reduces personnel handling over the prior art process.

A still further object of this invention is to provide a process to produce multiple layered energetic materials that reduces waste over the prior art process.

This invention accomplishes these objectives and other needs related to production of energetic materials by providing a continuous, integrated process to produce a multiple layered energetic material where the layers comprise energetic materials having, at least, two different burning rates. The process uses at least two twin-screw extruders to process at least two different energetic materials. These energetic materials are extruded into a co-extrusion die that, first, thins each energetic material flow into layers, and, then, combines the layers into a multiple layered energetic material. One embodiment of the invention also includes a remote take away system that completes processing the multiple layered energetic material after it leaves the co-extrusion die. The outer edges of the multiple layered material are first trim cut, then rolled into wrapped spools. Finally, the wrapped spools are cut into specified lengths for final use. These cutting, trimming and rolling steps are all done automatically, with no personnel handling required.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The invention, as embodied herein, comprises a continuous process for making multiple layered materials wherein the materials comprise energetic materials having different burning rates. In general, the process comprises the following steps. A first energetic fill material, a binder, and a plasticizer are fed into a first twin-screw extruder to make a first energetic material. A second energetic fill material, a binder, and a plasticizer are fed into a second twin-screw extruder to make a second energetic material. Normally, these energetic materials will have different burning rates. The process flow from each of the twin-screw extruders are both fed directly into a co-extrusion die. The die will first flatten each of the process flows and then combine them into layers to form a multiple layered energetic material. In one embodiment of the invention, further processing may include a remote take away system for the multiple layered energetic material. This remote take away system may include trim cutting the outer edges of the multiple layered energetic material, rolling the material, and cutting the material into selected lengths.

Figure 1:
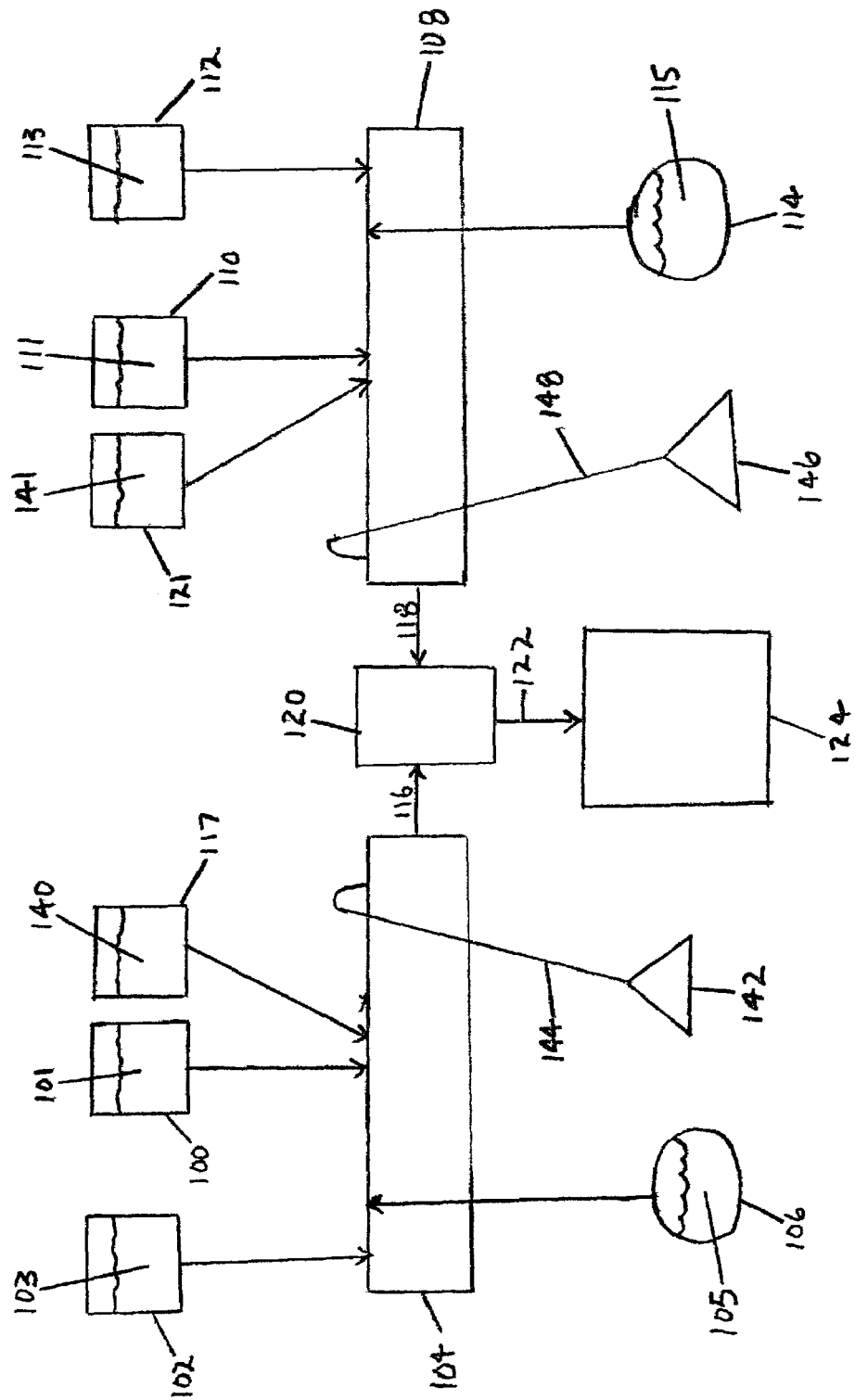
FIG. 1 is a facility layout diagram showing the process equipment used in the invention.

Referring to FIG. 1, one embodiment of the invention comprises solid feeder 100, containing an energetic feed material 101, and solid feeder 102, containing a binder 103, feed into a first twin-screw extruder 104. A liquid feeder 106, containing a plasticizer 105, also feeds into the twin-screw extruder 104. In one embodiment of the invention, a solid feeder 117, containing a burn rate modifier 140, may also feed into the twin-screw extruder 104. In a separate embodiment of the invention, the burn rate modifier 140 may be added into the same feeder 100 as the energetic feed material 101. A similar set-up for a second twin-screw extruder 108 comprises a solid feeder 110, containing an energetic feed material 111, and a solid feeder 112, containing a binder 113. A liquid feeder 114, containing a plasticizer 115, also feeds into the twin-screw extruder 108. An optional feeder 121, containing a burn rate modifier 141, may also feed into twin-screw extruder 108. Both twin-screw extruders 104, 108 feed processed energetic materials (116 and 118 respectively) into a die 120. The die 120 first thins energetic materials 116 and 118 and then combines said materials 116, 118 into a multiple layered energetic material 122.

The mixing of energetic materials requires imparting energy via shear into the materials in a controlled manner to avoid an energetic materials incident. Safety regulations also require that personnel exposure be limited during energetic material processing. Therefore, the invention also may include a remote take away system 124 that completes processing of the multiple layered energetic material 122.

Solid feeders 100, 102, 110, and 112 can be any type of feeder normally used in energetic materials processing and may be selected by one skilled in the art. One specific preferred solid feeder 100, 102, 110, 112 comprises a Vibratory Feeder manufactured by Thayer corporation. Liquid feeders 106 and 114 can also be any type of feeder normally used in energetic materials processing and may be selected by one skilled in the art. On specific preferred liquid feeder 106, 114 comprises a Gear Pump manufactured by Zenith corporation.

Energetic feed materials 101 and 111 may also be selected by one skilled in the art depending upon the specific characteristics of the final material desired. These energetic feed materials may be the same or different from one another and may also include one or more burn rate modifiers 140, 141. Preferred materials include those used in manufacturing gun propellants. Some examples of energetic feed materials 101 and 111 inlcude compositions of RDX (Cyclotrimethylenetrinitramine), HMX (Cyclotetramethylenetetranitramine), TNT (Trinitrotoluene), and PETN (Pentaerythritol tetranitrate). Examples of burn rate modifiers 140, 141 added to the energetic feed materials 101 and 111 include TAGZT (Triaminoguanidinium azotetrazolate), TATB (Triaminotrinitrobenzene), FOX 7 (Diaminodinitroethylene), and FOX 12 (Guanylurea dinitramide).

The binders 103 and 113 must be compatible with the energetic feed materials 101 and 111 and may be selected by one skilled in the art. For gun propellants, thermoplastic solid binders are preferred. Examples of such binders include Bamo Ammo (Bis(azidomethyl)-oxetane/azidomethyl-methyl-oxetane) or Hytrel® (a thermoplastic polyether ester elastomer block copolymer manufactured by DuPont). Plasticizers 105 and 115 must be compatible with the binders 103 and 113 and may also be selected by one skilled in the art. Examples of preferred plasticizers inlcude Triacetin or BuNena (Butyl-nitroxyethyl-nitramine).

Figure 2:
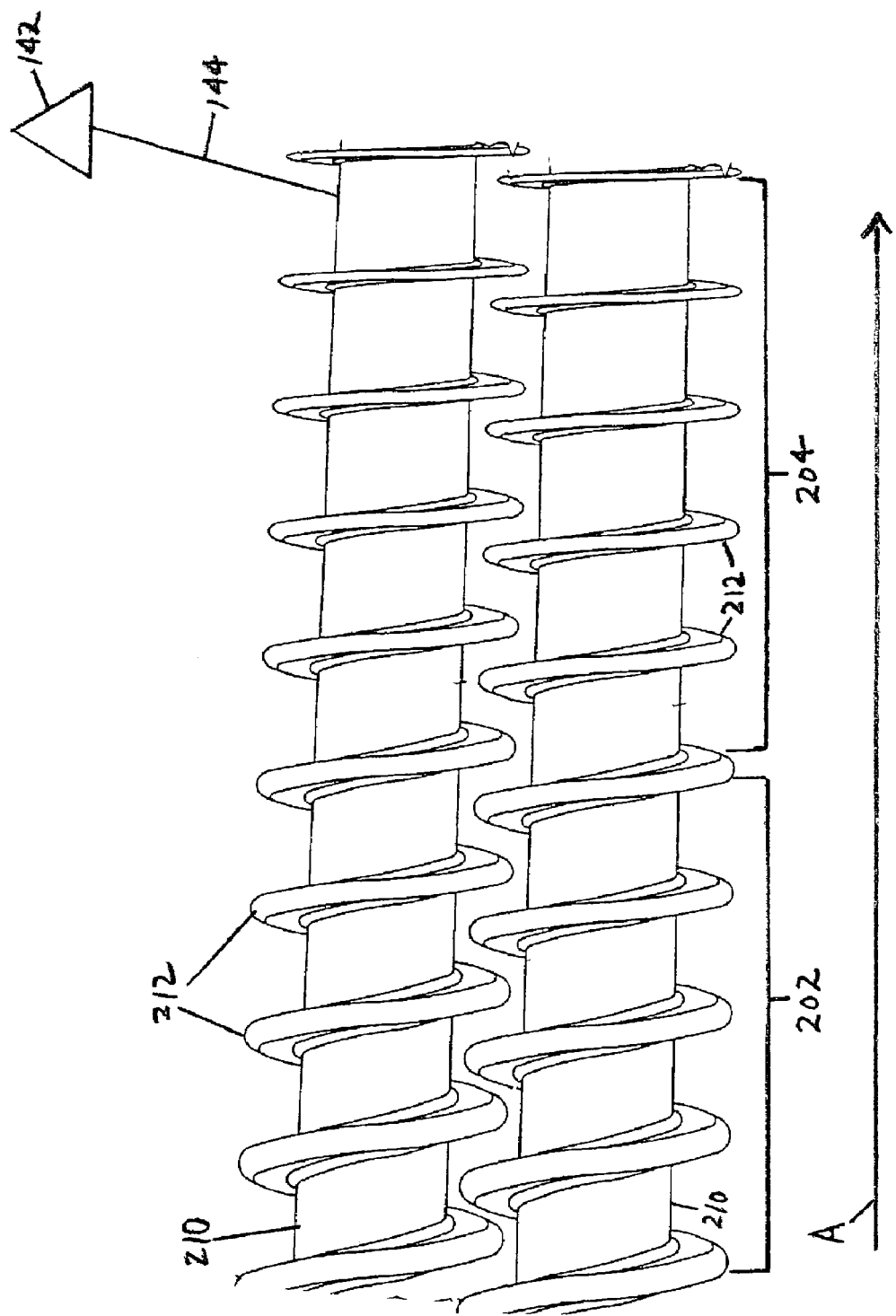
FIG. 2 is a top view of the twin-screws within the twin-screw extruder that process the ingredients to make energetic materials.

Referring to FIGS. 1 and 2, the processing portion of a twin-screw 200 is depicted. Two rods 210 have screw extenders 212 that intermesh in order to process energetic materials. Arrow A shows the direction of the material flow. In the first stage mixing section 202, the binder 103, 113 is melted and the plasticizer 105, 115 is incorporated into the binder 103, 113. In the second stage mixing section 204, the energetic fill material 101, 111 (and any burn rate modifier 140, 141) is mixed into the melted binder 103, 113/plasticizer 105, 115. Thus, from a feed standpoint, the binder 103, 113 and the plasticizer 105, 115 are fed into the twin-screw extruder 104 and 108 prior to feeding the energetic fill material 101, 111 (and any burn rate modifier 140, 141). As the materials are conveyed down the screws 200, a vacuum pump 142 pulls a vacuum in order to remove entrained air from mixture prior to extrusion. The vacuum pump 142 may be connected to the twin-screw extruder 104 by means of a standard hose 144. Similar vacuum pump 146 and hose 148 are depicted connected to twin-screw extruder 108. The amount of vacuum may be selected by one skilled in the art depending upon the material being processed. For most gun propellants, a vacuum of approximately 10 mm HG is used.

Figure 3:
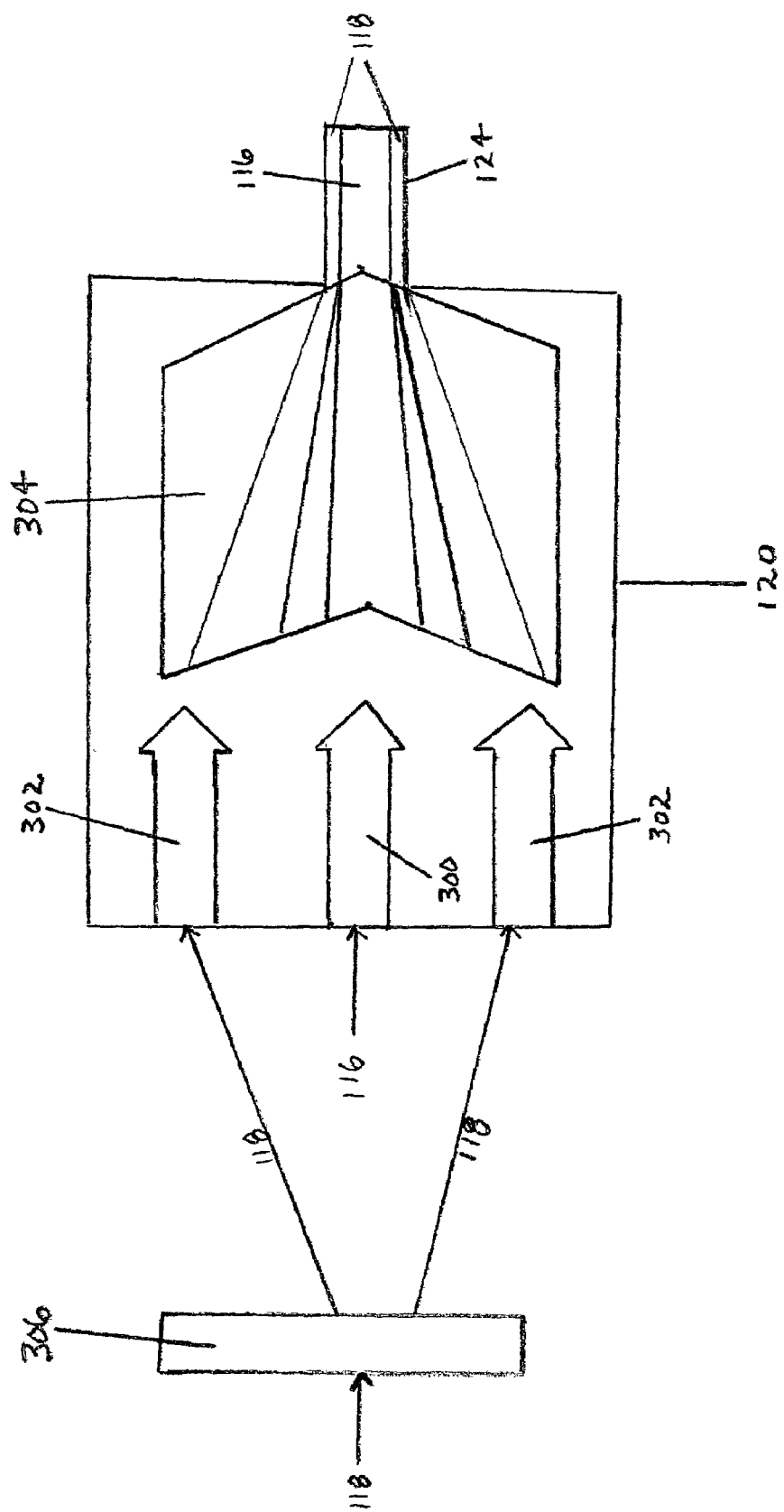
FIG. 3 is a transparent side view of the co-extrusion die used to create the multiple layered energetic material from the products extruded from the twin-screw extruders.

Referring to FIGS. 1 and 3, the die 120 will be fed with the materials from both twin-screw extruders 104 and 108 into sections 300 and 302. A manifold 306 will separate the slower burning of the energetic materials 118 into two streams that enter the flow through sections 302. Sections 300 and 302 will separately press the energetic materials 116 and 118 into thin layers. The thickness and width of the layers are selected depending upon the materials and final product desired. One example provides layers having a thickness of about 0.15 inches from sections 302 and about 0.085 inches for section 300. Preferably, both sections provide layers having a thickness of approximately 5 inches. In section 304 of the die 120, the energetic materials 116 and 118 will converge and be pressed into a multiple layered energetic material 122. One preferred embodiment of the invention will produce a multiple layered energetic material 124 comprises one layer of the faster burning of the energetic materials 116 sandwiched between two layers of the slower burning of the energetic materials 118.

Figure 4:
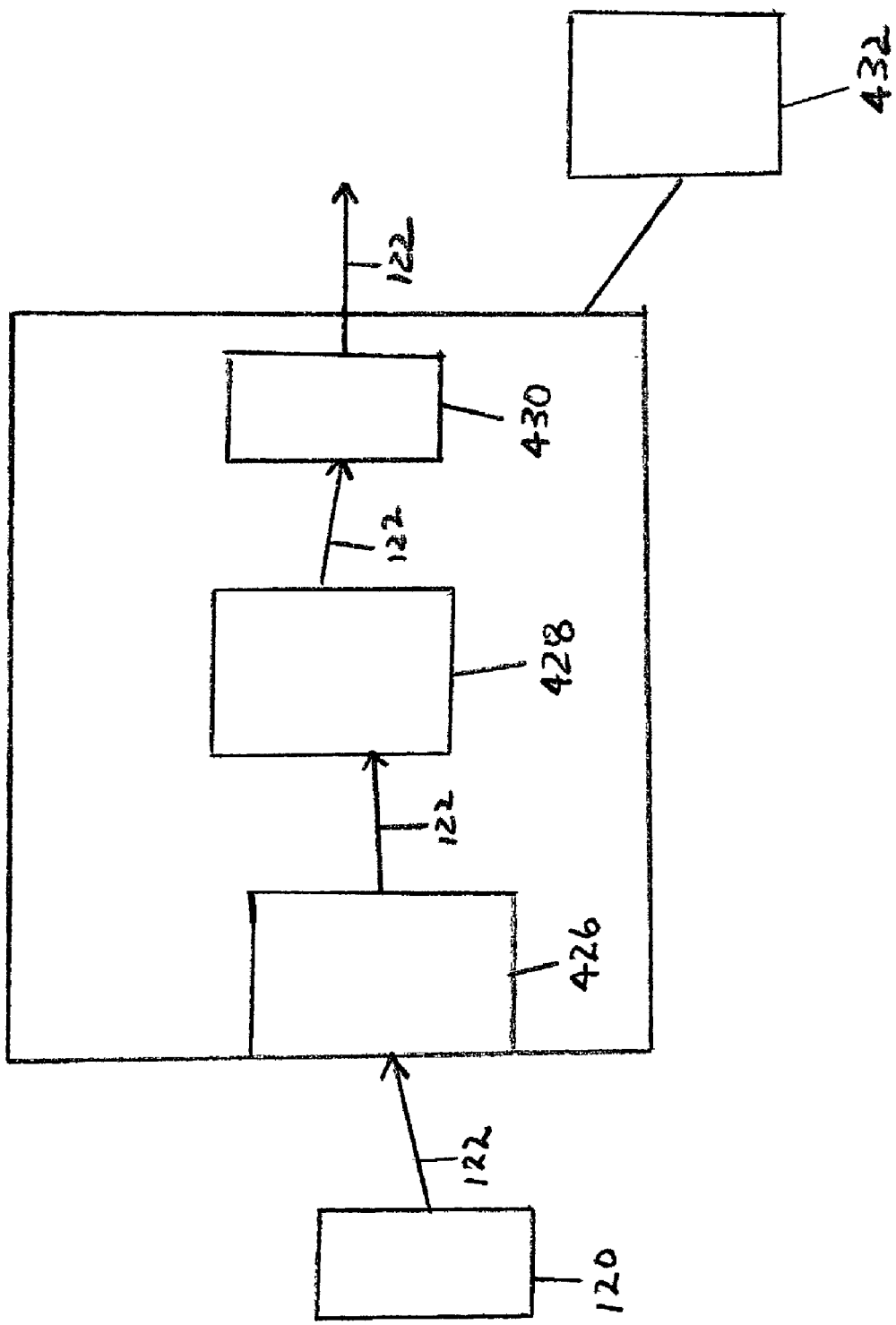
FIG. 4 is a top view block diagram of the take away system of the present invention.

Referring to FIGS. 1 and 4, the invention may also comprise a remote take away system 124. The remote take away system 124 comprises a trim cutter 426 that trim cuts the outer edges of the multiple layered energetic material 124 after said material 124 exits the die 120. A roller 428 rolls the multiple layered energetic material 124 into wrapped spools after trim cutting. Finally, a cutter 430 cuts the wrapped spools into selected lengths. The trim cutter 426, roller 428, and cutter 430 are all controlled remotely through controller means 432. Controller means 432 may be selected by one skilled in the art and may include software, electronic, and mechanical means or a combination thereof.

What is described are specific examples of many possible variations on the same invention and are not intended in a limiting sense. The claimed invention can be practiced using other variations not specifically described above.

What is claimed is:

1. A continuous process for making multiple layered energetic materials comprising at least two materials having different burning rates, comprising:

feeding a first energetic fill material, a first binder, and a first plasticizer into a first twin-screw extruder for making a first energetic material;

feeding a second energetic fill material, a second binder, and a second plasticizer into a second twin-screw extruder for making a second energetic material; and, pressing the first energetic material and the second energetic material into a die,
  wherein the die forms and thins the first energetic material and the second energetic material into separate layers, and converges said separate layers into a multiple layered energetic material, and
  wherein said first binder is fed into said first twin-screw extruder prior to said first energetic fill material and said first plasticizer.

2. The process of claim 1, further comprising remotely taking the multiple layered energetic material from the die.

3. The process of claim 2, wherein said remotely taking comprises trim cutting outer edges of the multiple layered energetic material after said material exits the die.

4. The process of claim 3, wherein said remotely taking further comprises rolling the multiple layered energetic material into wrapped spools after trim cutting.

5. The process of claim 4, wherein said remotely taking further comprises cutting the wrapped spools into selected lengths.

6. The process of claim 1, wherein the feeding steps includes feeding a burn rate modifier into at least one of said first twin-screw extruder and said second twin-screw extruder.

7. The process of claim 6, wherein the feeding steps comprise feeding the first plasticizer into the first twin-screw extruder—and the second plasticizer into the second twin-screw extruder, and
  wherein the first binder is melted and the first plasticizer is incorporated into the first binder, which is melted.

8. The process of claim 7, wherein the feeding steps further comprise feeding the first energetic fill material into said first twin-screw extruder, and the second energetic material and the burn rate modifier into the second twin-screw extruder, and
  wherein said second energetic fill material and the burn rate modifier is mixed into the second plasticizer and the second binder, which is melted.

9. The process of claim 8, wherein the feeding steps further comprise pulling a vacuum to evacuate entrained air prior to extrusion.

10. The process of claim 1, wherein the feeding steps further comprise using solid feeders to feed at least one of said first binder and the second binder, at least one of the first energetic fill material and the second energetic fill material, and at least one burn rate modifer, and
  wherein the feeding steps comprise using liquid feeders to feed at least one of the first plasticizer and the second plasticizer.

11. The process of claim 1, wherein the second energetic material includes a faster burning rate than a burning rate of the first energetic material.

12. The process of claim 1, wherein the multiple layered energetic material comprises a layer of second energetic material situated between two layers of said first energetic material.

13. The process according to claim 1, wherein said separate layers comprise three separate layers.

14. The process according to claim 1, wherein said separate layers each include a thickness of an approximately equal thickness.

15. The process according to claim 1, further comprising separating one of said first energetic material and said second energetic material into two streams after entering a manifold of said die.

16. The process according to claim 15, further comprising pressing said two streams into a plurality of separate, thin layers.

17. The process according to claim 1, wherein said die comprises a plurality of pressing sections for separately pressing said first energetic material and said second energetic material into said separate layers.

18. The process according to claim 1, wherein said die comprises a convergence section for converging and pressing said separate layers of said first energetic material and said second energetic material into said multiple layered energetic material.

19. A process for making multiple layered energetic materials, comprising:
  feeding a first energetic fill material, a first binder, and a first plasticizer into a first twin-screw extruder to make for making a first energetic material;
  feeding a second energetic fill material, a second binder, and a second plasticizer into a second twin-screw extruder for making a second energetic material; and
  pressing the first energetic material and the second energetic material into a die,
    wherein the die comprises a first portion and a second portion, said first portion separates the second energetic material into separate layers and presses said separate layers and said first energetic material into separate thin layers, and said second portion converges said separate thin layers into a multiple layered energetic material, and
    wherein said first binder is fed into said first twin-screw extruder prior to said first energetic fill material.

20. A process for making multiple layered energetic materials, comprising:
  feeding a first energetic fill material, a first binder, and a first plasticizer into a first twin-screw extruder for making a first energetic material;
  feeding a second energetic fill material, a second binder, and a second plasticizer into a second twin-screw extruder for making a second energetic material;
  pressing the first energetic material and the second energetic material into a die; and
  forming a plurality of separate outer layers from one of said first energetic material and said second energetic material, and forming an inner core from one of said first energetic material and said second energetic material;
  pressing said plurality of separate outer layers and said inner core into a plurality of separate, thin layers; and
  converging said plurality of separate, thin layers into a multiple layered energetic material,
    wherein said plurality of separate outer layers comprise a slower burning energetic material than said inner core comprised of a faster burning energetic material, and
    wherein said first binder is melted prior to said first energetic fill material being fed into said first twin-screw extruder.

* * * * *